(12) United States Patent
Jin et al.

(10) Patent No.: US 8,699,196 B2
(45) Date of Patent: Apr. 15, 2014

(54) THERMAL PROTECTION CONTROL METHOD AND SYSTEM

(75) Inventors: Linfang Jin, Shenzhen (CN); Guzhang Wu, Shenzhen (CN); Taotao Zhou, Shenzhen (CN); Laili Feng, Schenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 145 days.

(21) Appl. No.: 13/163,023

(22) Filed: Jun. 17, 2011

(65) Prior Publication Data

US 2011/0249371 A1    Oct. 13, 2011

Related U.S. Application Data

(63) Continuation of application No. PCT/CN2009/074701, filed on Oct. 29, 2009.

(30) Foreign Application Priority Data

Dec. 18, 2008 (CN) .......................... 2008 1 0187225

(51) Int. Cl.
*H02H 5/04* (2006.01)

(52) U.S. Cl.
USPC ........................................................ 361/103

(58) Field of Classification Search
USPC ........................................................ 361/103
See application file for complete search history.

(56) References Cited

U.S. PATENT DOCUMENTS

| | | | | |
|---|---|---|---|---|
| 7,961,446 B2 * | 6/2011 | Ide et al. | ....................... | 361/103 |
| 2004/0120382 A1 | 6/2004 | Bennett et al. | | |
| 2009/0262468 A1 | 10/2009 | Ide et al. | | |

FOREIGN PATENT DOCUMENTS

| | | |
|---|---|---|
| CN | 1567668 | 1/2005 |
| CN | 101268596 | 9/2008 |
| CN | 101431228 | 5/2009 |
| EP | 1 933 439 A1 | 6/2008 |
| JP | 2006-304043 | 11/2006 |
| WO | 2007032489 A1 | 3/2007 |

OTHER PUBLICATIONS

Ide Yuzo, Temperature protection circuit, power supply device, and electronic apparatus; Publication date: Mar. 29, 2007; Abstract and detailed description.*

International Search Report from P.R. China in International Application No. PCT/CN2009/074701, mailed Feb. 11, 2010.

Written Opinion of the International Search Authority related to International Application No. PCT/CN2009/074701, mailed Feb. 11, 2010, for Huawei Technologies Co., Ltd.

First Office Action of Chinese Application 200810187225.7, mailed Jan. 29, 2010.

Extended European Search Report dated (mailed) Feb. 10, 2012, issued in related Application No. 09832890.9-2210, PCT/CN2009074701, Hauwei Technologies Co., Ltd.

* cited by examiner

*Primary Examiner* — Dharti Patel
(74) *Attorney, Agent, or Firm* — Conley Rose, P.C.; Grant Rodolph; Nicholas K. Beaulieu

(57) ABSTRACT

A thermal protection method and system of an Integrated Circuit (IC) are provided, which are applicable to a wireless terminal equipment. The method includes: measuring a temperature value of a protection point; comparing the measured temperature value with a thermal protection temperature threshold; and starting a protection measure when the measured temperature value reaches or exceeds the thermal protection temperature threshold and a duration of reaching or exceeding the thermal protection temperature threshold exceeds a preset time.

14 Claims, 10 Drawing Sheets

FIG. 4

THERMAL PROTECTION CONTROL METHOD AND SYSTEM

CROSS-REFERENCE TO RELATED APPLICATIONS

This application is a continuation of International Application No. PCT/CN2009/074701, filed on Oct. 29, 2009, which claims priority to Chinese Patent Application No. 200810187225.7, filed on Dec. 18, 2008, both of which are hereby incorporated by reference in their entireties.

FIELD OF THE INVENTION

The present invention relates to the field of data communication technologies, and in particular, to a thermal protection control method and system of an Integrated Circuit (IC).

BACKGROUND OF THE INVENTION

With the development of electronics and chip packaging technologies, a heat flux intensity of an electronic product trends to increase rapidly. Continuously enhanced functions, seeking for an extremely compact volume, miniaturization, and thinning-down are important competitive powers of a terminal product. Especially for a wireless data card employing Third Generation (3G)/Fourth Generation (4G) technologies at present, natural heat dissipation is required; however, in a case of the maximal transmit power (Pout=Pmax), the heat flux intensity even exceeds 120 W/L, and thus rationally up-rating heat design is necessary for the development of the electronics and chip packaging technologies. In fact, the terminal product is characterized by: a short life, which generally lasts 3 years to 5 years; a low thermal reliability requirement, in which a certain failure rate is permitted, and an average failure rate is generally 1% to 5%; and in a close relation with a consumer. FIG. 1 is a statistical probability distribution of a transmit power of a wireless terminal product. In the design idea, the wireless terminal product should meet the requirements of above 95% of users, de-rating design is generally not used for element heat design, and up-rating design is even used. Obviously, for a high heat-flux intensity terminal product, risk control is a critical technology.

The work characteristic of a radio frequency element as an analog electronic element is greatly influenced by the temperature. Therefore, a common solution is to dispose a temperature sensor unit in or close to the radio frequency element, so as to monitor the temperature of the radio frequency element such as a Power Amplifier (PA). In the design and production stages, a temperature compensation form is finished according to a test result. In a practical application, the transmit power is modified and compensated according to a reported temperature result. However, the temperature sensor unit must be located in or close to the radio frequency element, the measurement range is limited, and a required measurement range of thermal protection of a PA chip, a Subscriber Identity Module (SIM) card, a User Identity Model (UIM) card, a Universal Subscriber Identity Module (USIM) card, a Micro Secure Digital (MicroSD) card cannot be provided. A heat vulnerable point or vulnerable element is closely correlated with the product design, in a conventional method (for example, a temperature sensor unit is disposed in or close to a PA or a Power Management Integrated Circuit (PMIC)), a corresponding relation between the temperature sensor unit and a protected point is required to be deduced to determine the temperature of the protection point, time delay effect under the dynamic power consumption of a product is very obvious, and an erroneous report easily occurs. During normal working, the temperature reported by the temperature sensor unit is required to be continuously monitored. When the temperature reaches an alarm/shutdown threshold, software/hardware starts an alarm/shutdown related action. After shutdown or disconnection from a network, the temperature of the product drops rapidly, so as to ensure that the thermal reliability requirement of an element is satisfied. The shutdown temperature threshold is depended on the thermal design requirements, and de-rating or up-rating design may be used; however, the de-rating design is generally used, so as to ensure that the chip junction temperature does not exceed a permitted level commercially promised by a manufacturer.

A specific manner in which a temperature sensor unit performs thermal protection and power control on an element includes three-stage protection of a power supply management chip. For example, a temperature sensor unit is disposed in a PMIC chip, the temperature of the PMIC temperature sensor unit is read in running, and certain operations are executed when a certain threshold is reached:

(1) breaking off when the temperature Tj reaches 110° C.;

(2) breaking off and entering a lower power consumption mode to disable non-essential functions when the temperature Tj reaches 130° C.; and (3) powering off by the PMIC when the temperature Tj reaches 150° C.

However, in the procedure of implementation of the present invention, the inventors find that the prior art has the following problems. In a practical network, the temperature is an accumulated effect of power consumption and time. Due to the existence of multi-path effect and interference, the transmit power may change rapidly, as shown in FIGS. 2a and 2b. The rapid power change means that the temperature sensor unit changes with the power consumption change. In a case of short circuit of the temperature sensor unit, the temperature is considered to be very high, and considered to be very low in a case of open circuit, and great fluctuation of the temperature reported by software occurs in a case of intermittent short circuit and open circuit. In addition, what is processed by the temperature sensor unit is an analog signal, an analog signal in a Printed Circuit Board (PCB) may be interfered by other signals in routing, thus causing an erroneous report and erroneous protection resulting from fluctuation of the reported temperature, as shown in FIG. 3. In a practical application, due to the rapid change of the transmit power, the interference is intensified, thus causing an erroneous report and erroneous protection as shown in FIG. 4.

SUMMARY OF THE INVENTION

An objective of the present invention is to provide a thermal protection control method and system, so as to reduce unnecessary erroneous protection measures when the temperature reaches a threshold and then quickly restores to a normal level.

In order to achieve the above objective, an embodiment of the present invention provides a thermal protection control method, where the method includes:

measuring a temperature value of a protection point;

comparing the measured temperature value with a thermal protection temperature threshold; and starting a protection measure when the measured temperature value reaches or exceeds the thermal protection temperature threshold and duration of reaching or exceeding the thermal protection temperature threshold exceeds a preset time.

In order to achieve the above objective, an embodiment of the present invention further provides a thermal protection control system, where the system includes:

a plurality of temperature sensor units, disposed close to a protection point, and configured to measure a temperature of the protection point; and a timing unit, configured to count time;

a control unit, configured to compare the temperature value measured by the temperature sensor unit with a thermal protection temperature threshold, control the timing unit to start timing when a comparison result of the control unit is that the temperature value measured by temperature sensor unit reaches or exceeds the thermal protection temperature threshold, and reset the timing unit when the comparison result of the control unit is that the temperature value measured by the temperature sensor unit is smaller than the thermal protection temperature threshold; and a thermal protection device, configured to take a protection measure on the protection point when the time counted by the timing unit exceeds a preset time.

The present invention has the following beneficial effects.

1. The reliability of the measurement result higher than the threshold of the temperature sensor unit is ensured by disposing the timing unit to count time during which the temperature is higher than the threshold, thereby preventing an erroneous report caused by the fluctuation of a temperature reported by the-temperature sensor unit.

2. An erroneous report of thermal protection caused by temperature sensor unit failure is avoided by disposing two or more temperature sensor units, thereby improving the protection accuracy and reliability.

3. Thermal protection or power consumption control is implemented for a heat vulnerable point of a high heat-flux intensity terminal product, so as to prevent erroneous protection caused by an erroneous report and a failure of the temperature sensor unit in practical applications, thereby improving the product robustness, and effectively preventing problems of product safety risk, a vicious market, and potential batch faults triggered by accidental use.

BRIEF DESCRIPTION OF THE DRAWINGS

The accompanying drawings are provided to facilitate further understanding of the present invention, which are a part of the present invention, and are not intended to limit the present invention.

Figure 4:
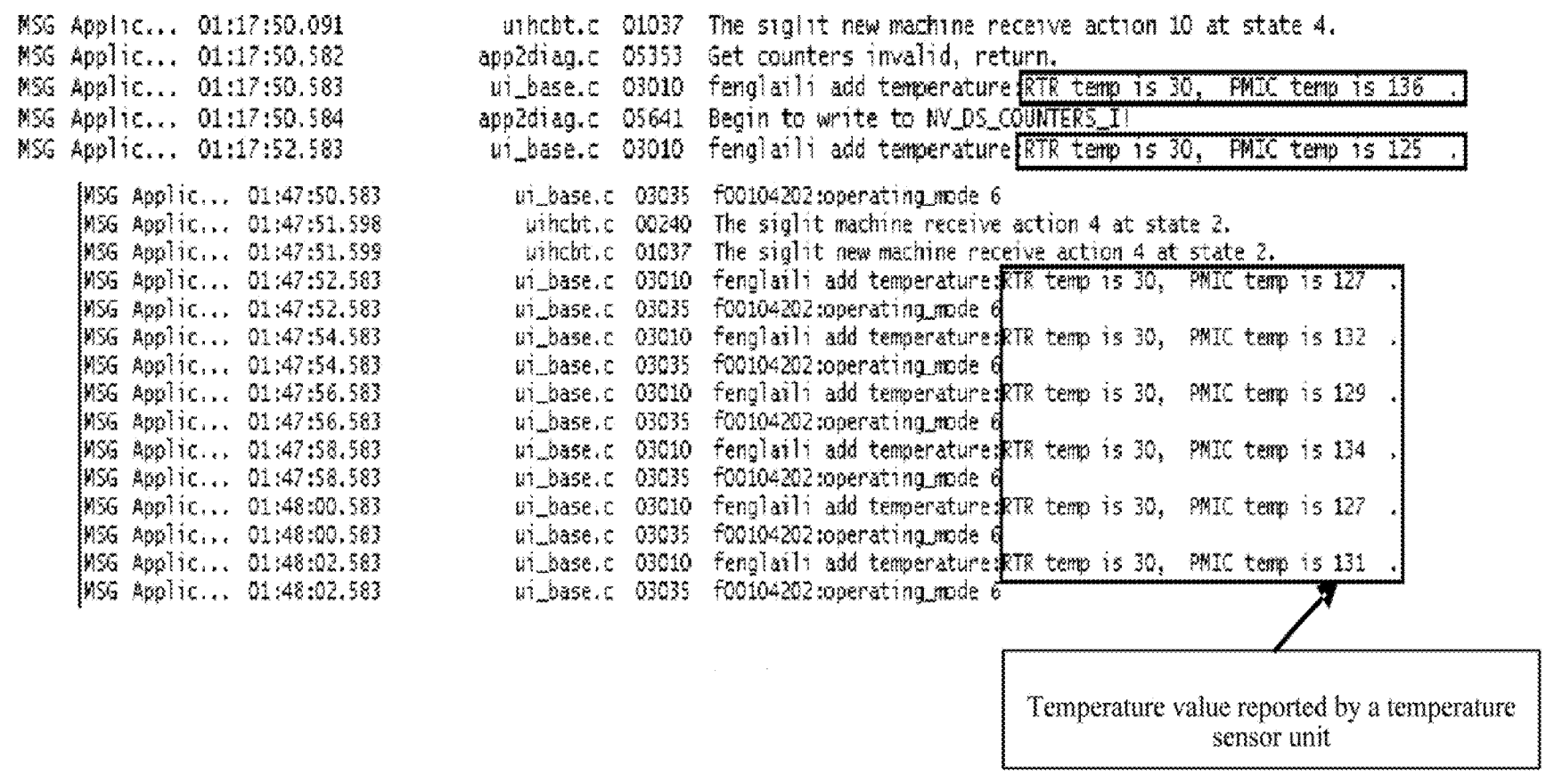

FIG. 4 is a schematic view of temperature monitoring of potential erroneous protection caused by fluctuation of a temperature reported by a temperature sensor unit (above a protection threshold);

DETAILED DESCRIPTION OF THE EMBODIMENTS

In order to make the objectives, technical solutions, and advantages of the present invention more comprehensible, the present invention is described in further detail hereinafter with reference to embodiments and the accompanying drawings. Herein, the schematic embodiments and descriptions of the present invention are used to explain the present invention, but not intended to limit the present invention.

Embodiment 1

Figure 1:
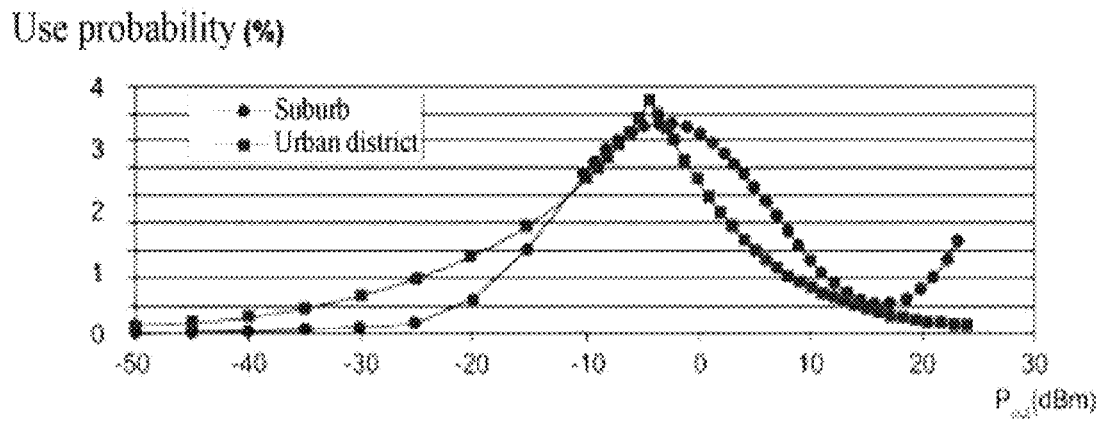
FIG. 1 is a schematic view of statistical distribution of network design and drive test of a transmit power of an existing wireless terminal product.
Figure 2A:
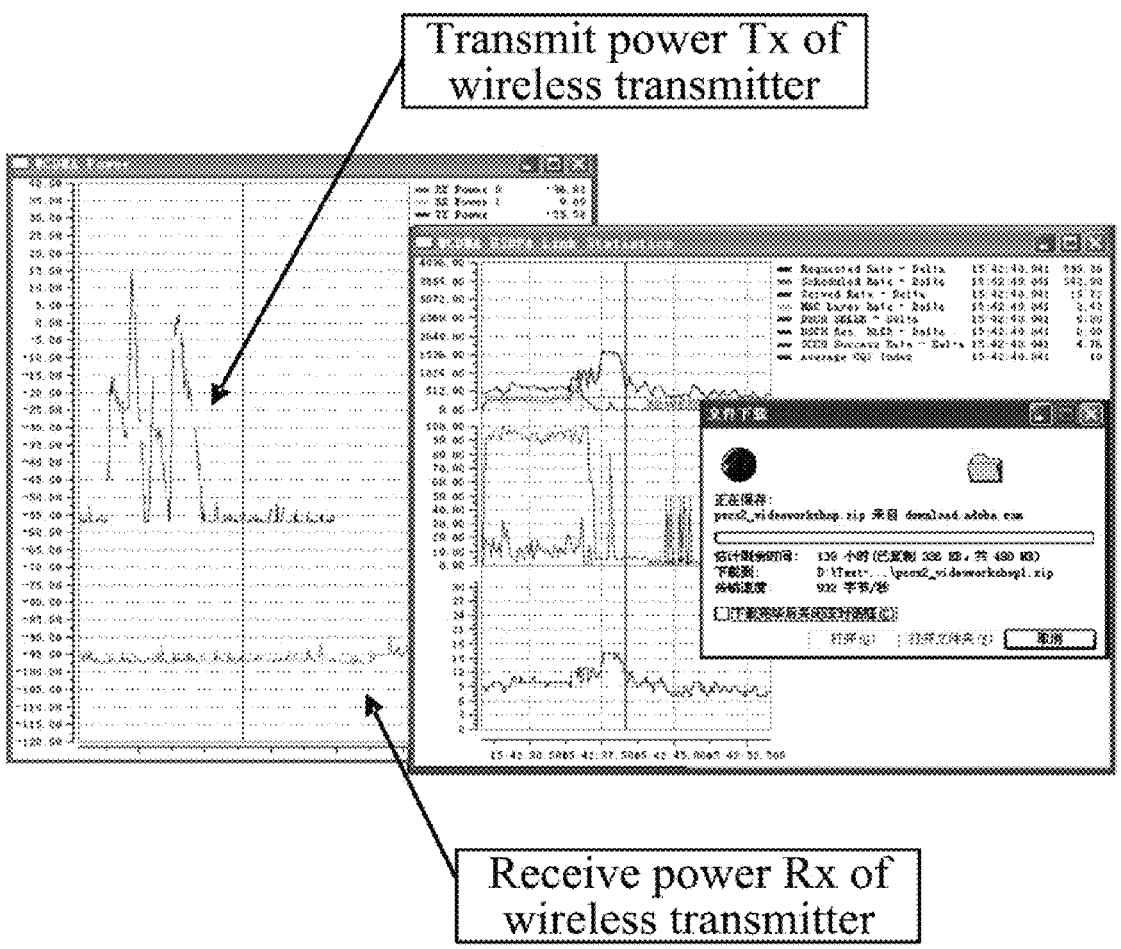
FIG. 2a is a schematic view of great fluctuation of a transmit power under a strong signal in an existing, practical network.
Figure 2B:
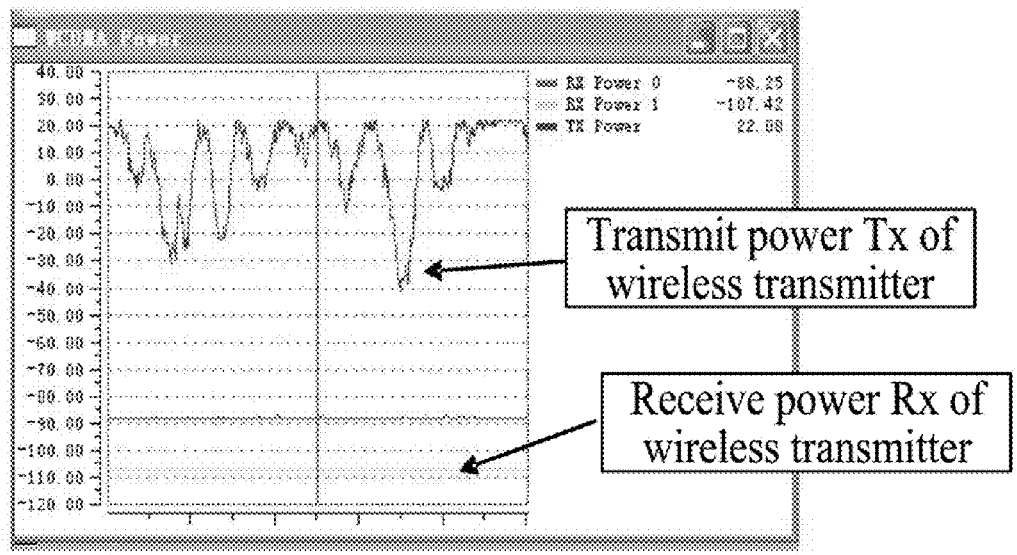
FIG. 2b is a schematic view of great fluctuation of a transmit power under a weak signal in an existing practical network.
Figure 3:
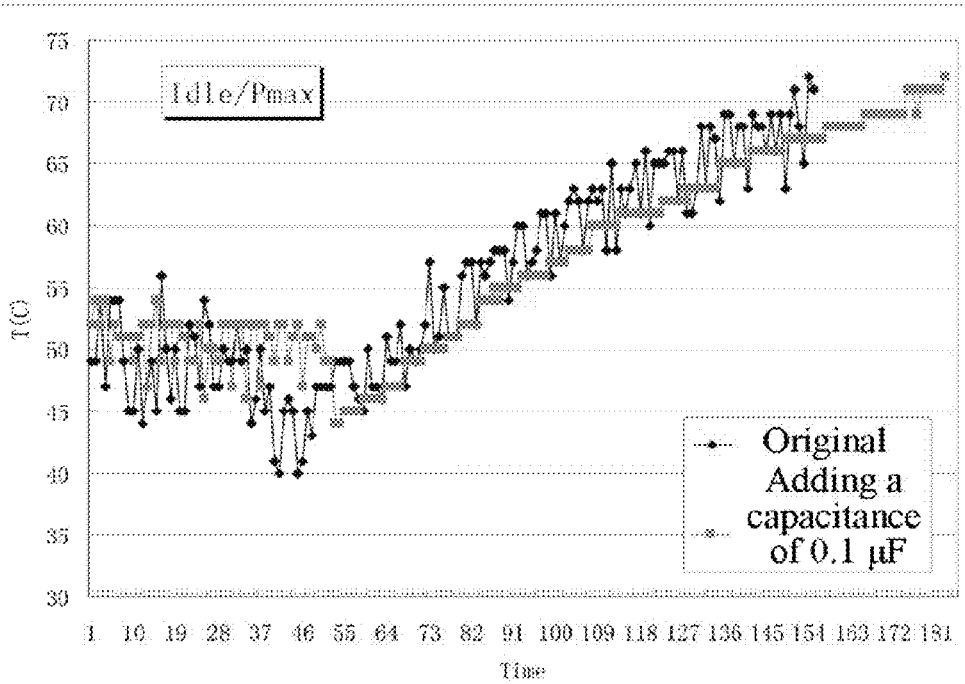
FIG. 3 is a schematic view of fluctuation of a temperature reported by a temperature sensor unit.
Figure 5:
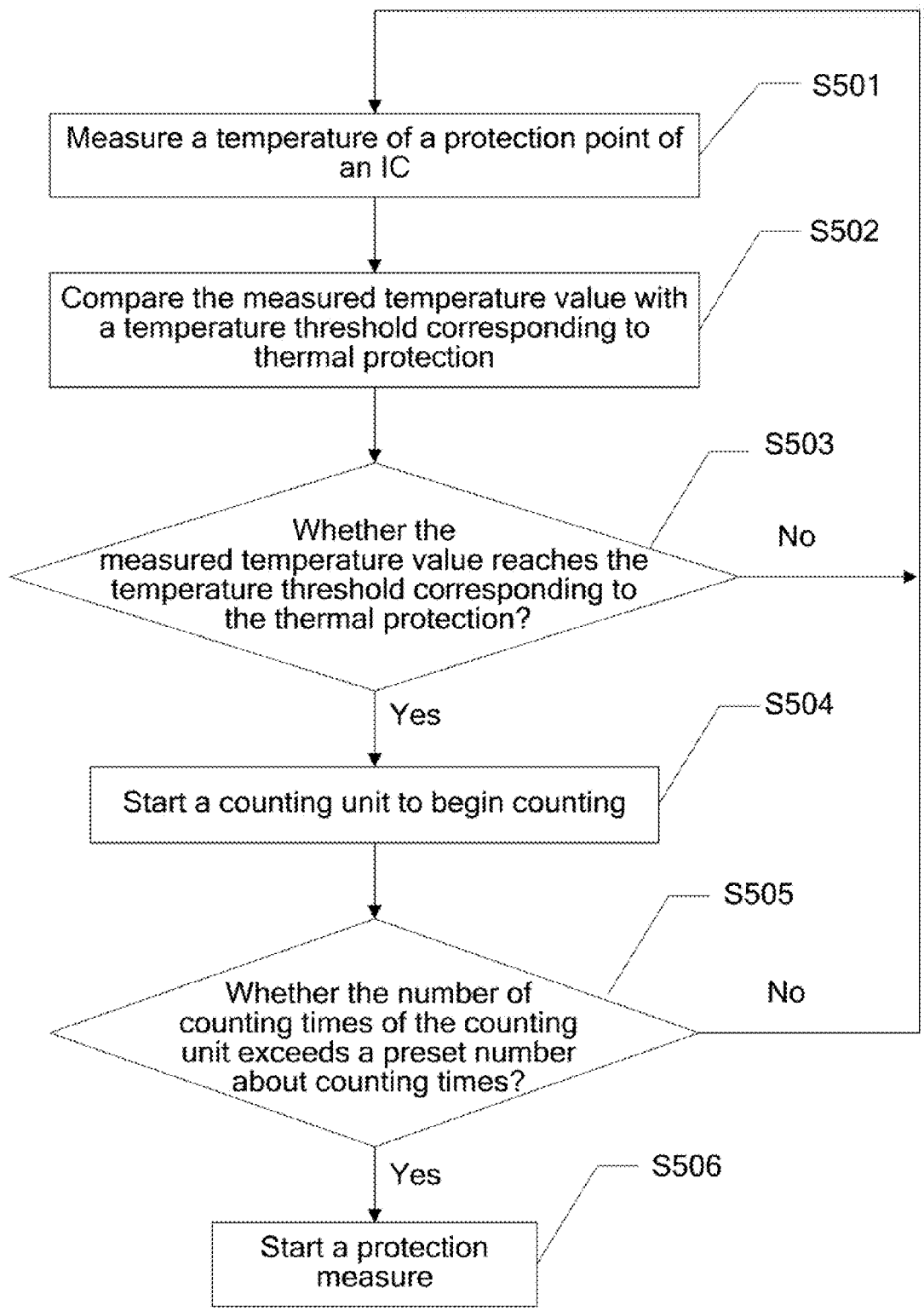
FIG. 5 is a flow chart of a first embodiment of a method for preventing an erroneous report of thermal protection according to an embodiment of the present invention.

Reference can be made to FIG. 5. FIG. 5 is a flow chart of a first embodiment of a method for preventing an erroneous report of thermal protection according to an embodiment of the present invention. At least one temperature sensor unit is disposed close to a protection point of an IC, such as a PA, a PMIC, a UIM card, an SIM card, a USIM card, and a storage card. A thermal protection starting threshold of a temperature sensor unit is determined after the heat design of an IC is completed, that is, a corresponding relation between a temperature measured by the temperature sensor unit and a protection point is determined under different transmit powers, service modes, and abnormal use conditions. A corresponding counting unit of the temperature sensor unit is disposed at the same time. The temperature value measured by the temperature sensor unit is read, that is, the temperature value of the protection point of the IC is measured (step S501), and the measured temperature value is compared with the corresponding temperature threshold of thermal protection (step S502), to determine whether the measured temperature value reaches the corresponding temperature threshold of the thermal protection (step S503), the counting unit is started (generally counting at an interval of 1 s to 10 s) if the temperature reaches the threshold (step S504); if the temperature does not reach the threshold, step S501 is re-performed to measure the temperature close to the protection point again. It is determined whether the number of counting times of the counting unit exceeds a preset number about counting times (that is, preset times) (S505), a protection measure is started (S506) if the number of counting times of the counting unit exceeds the preset number about counting times (generally, 5 times to 20 times); if the number of counting times of the counting unit does not exceed the preset number about counting times, step S501 is re-performed to measure the temperature close to the protection point again. When the counting does not reach the preset times, if the temperature is dropped below the threshold once, the counting is begun again, so as to avoid the influence of a network signal and temperature fluctuation.

If the temperature fluctuation is beyond a certain range in the preset time, for example, the temperature fluctuation is beyond 5° C. (may be 2° C. to 10° C.) in 2 s (not limited to, 2 s, and may be for example 1 s to 10 s), the temperature sensor unit is determined to be ineffective; when an abnormal value of the temperature, for example, lower than −30° C. or higher than 200° C. occurs, the temperature sensor unit is determined to be ineffective.

The protection measure, is not limited to shutdown, and may be a low power consumption mode of closing a radio frequent module, or a standby mode of only maintaining registration. A power consumption control mode of down regulating a limitation on the highest transmit power without conforming to a protocol and a base station requirement may also be used.

Specifically, the following manner may be used, an IC is provided with two temperature sensor units, one is a main temperature sensor unit having a high read precision, for reading and monitoring the temperature of a protected point; the other one is an auxiliary temperature sensor unit having a low precision, but a high reliability, and is generally a temperature sensor unit used for radio frequency temperature compensation. When a thermal protection action is intended to be taken after the temperature measured by the main temperature sensor unit reaches the threshold, for example, if the temperature reported by the auxiliary temperature sensor unit is lower than a rough threshold, an erroneous report of the main temperature sensor unit is determined, and protection control is provided by the auxiliary temperature sensor unit, or the auxiliary temperature sensor unit does not play a control role, and the main temperature sensor unit does not play the control role either, and no thermal protection action is taken.

When the IC is provided with three or more temperature sensor units, protection control may be performed by using a voting mechanism (for example, simple majority, or more than two votes). If only one temperature sensor unit reaches the threshold, the temperature sensor unit is considered to be ineffective, and no protection measure is taken, and the protection measure is taken only when two or more temperature sensor units reach the threshold.

According to the embodiment of the present invention, one or more temperature sensor units are disposed, and the number of counting times of the temperature reaching the threshold is set, so as to ensure the reliability of the measurement result of the temperature sensor unit that is higher than the threshold, thereby preventing an erroneous report of thermal protection caused by the fluctuation of the temperature reported by the temperature sensor unit.

Embodiment 2

Figure 6A:
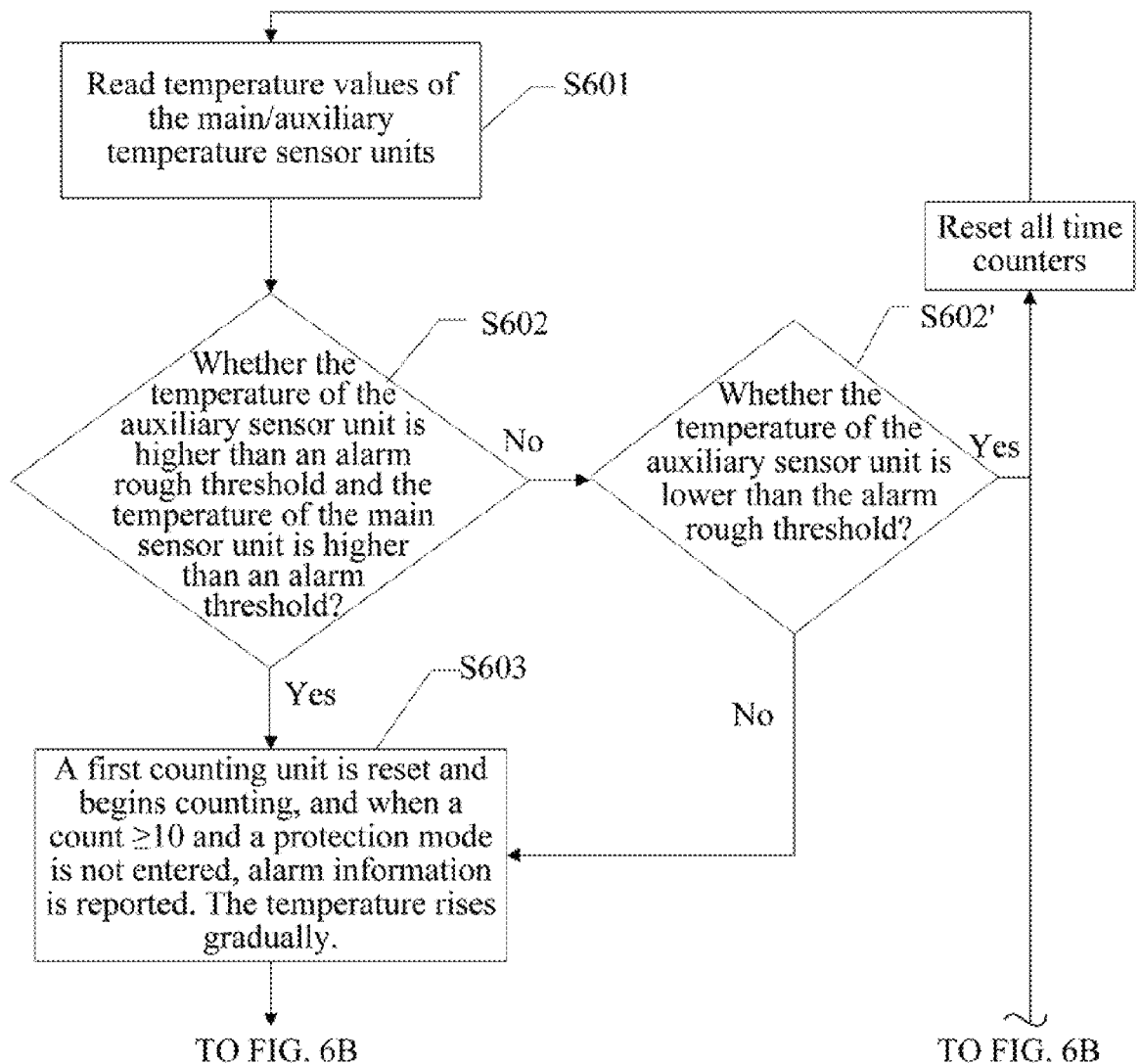
FIGS. 6A and 6B show a flow chart of a second embodiment of a method for preventing an erroneous report of thermal protection according to an embodiment of the present invention.
Figure 6B:
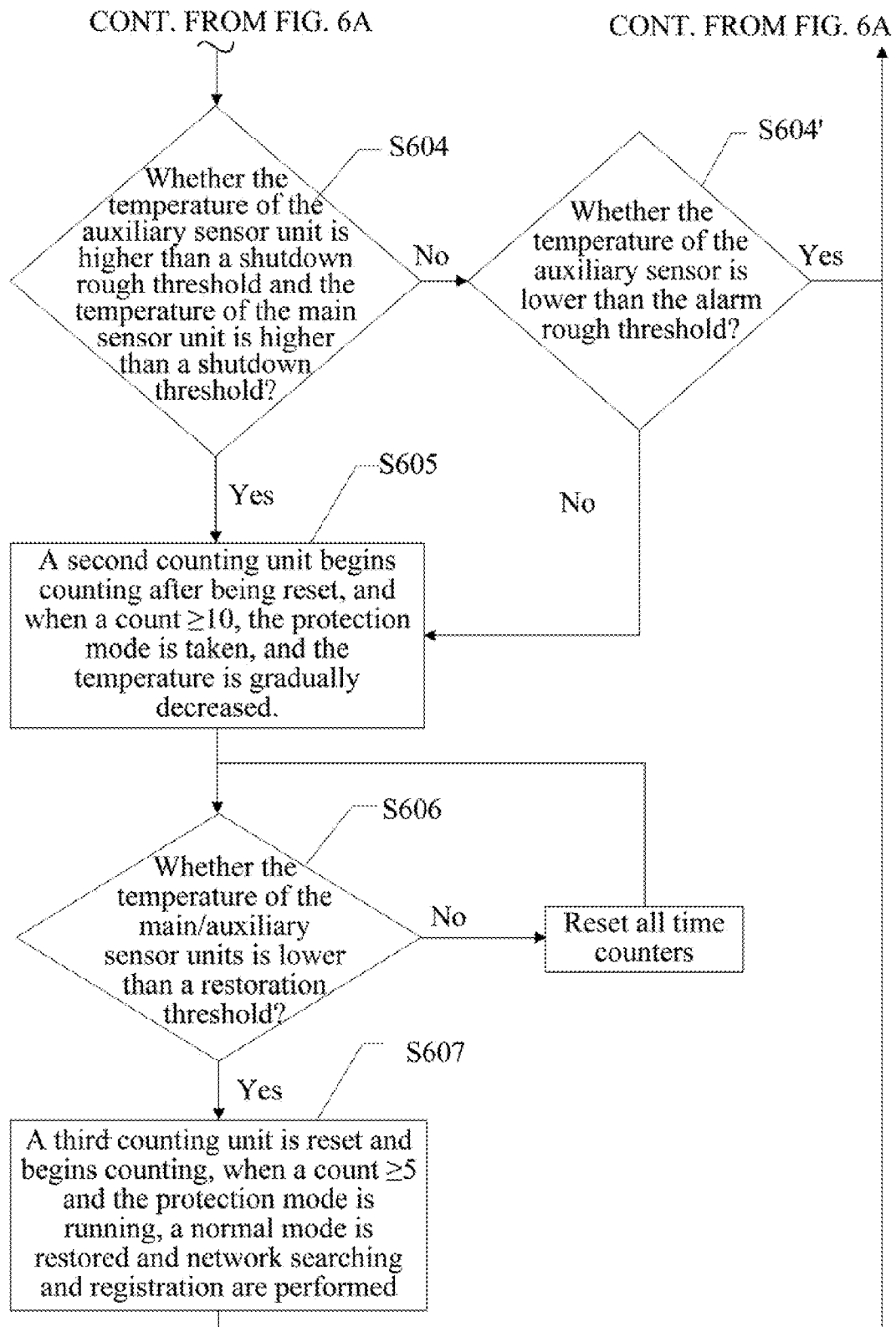

The method for preventing an erroneous report of thermal protection according to an embodiment of the present invention is described hereinafter according to FIG. 6. FIG. 6 is a flow chart of a second embodiment of the method for preventing an erroneous report of thermal protection according to an embodiment of the present invention. In this embodiment, a main temperature sensor unit and an auxiliary temperature sensor unit are disposed close to a protection point of an IC. The method includes the following steps.

In step S601, temperature values of the main/auxiliary temperature sensor units are read, so as to obtain the temperature values at the protection point of the IC.

In step S602, it is determined whether the temperature of the auxiliary temperature sensor unit is higher than an alarm rough threshold and the temperature of the main temperature sensor unit, is higher than an alarm threshold, step S603 is performed if sensor unit is higher than an alarm rough threshold and the temperature of the main temperature sensor unit is higher than an alarm threshold, and it can be determined whether the main temperature sensor unit works normally if not: When the temperature of the auxiliary temperature sensor unit is lower than a shutdown rough threshold and the temperature of the main temperature sensor unit is higher than the alarm threshold, or when an absolute value of a difference between any adjacent two read temperatures reported by the main temperature sensor unit is higher than a set temperature value, the main temperature sensor unit is determined to be ineffective, and the thermal protection control is provided by the auxiliary temperature sensor unit, so as to ensure the correctness of the action of shutdown and be beneficial to determine whether a remedial measure is taken. In this case, step S602' may be specifically selected for implementation, so as to determine whether the temperature of the auxiliary temperature sensor unit is lower than the alarm rough threshold, step S603 is performed if the temperature of the auxiliary temperature sensor unit is not lower than the alarm rough threshold; if the temperature of the auxiliary temperature sensor unit is lower than the alarm rough threshold, step S601 is performed after resetting all counters. The set temperature value may be any temperature value from 5° C. to 10° C., such as 5° C.

In step S603, a first counting unit begins counting after being reset, when a count ≥10 and a protection mode is not entered, alarm information is reported, so as to warn that the IC is in an abnormal work status, and the temperature thereof rises continuously.

In step S604, it is determined whether the temperature measured by the auxiliary temperature sensor unit is higher than the shutdown rough threshold and the temperature measured by the main temperature sensor unit is higher than a shutdown threshold, step S605 is performed if the temperature measured by the auxiliary temperature sensor unit is higher than the shutdown rough threshold and the temperature measured by the main temperature sensor unit is higher than a shutdown threshold; otherwise, it is determined whether the main temperature sensor unit works normally: When the temperature of the auxiliary temperature sensor unit is lower than the shutdown rough threshold, and the temperature of the main temperature sensor unit is higher than the alarm threshold, or when an absolute value of the difference between any adjacent two read temperatures reported by the main temperature sensor unit is larger than a set temperature value, the main temperature sensor unit is determined to be ineffective, and the thermal protection control is provided by the auxiliary temperature sensor unit, so as to ensure the correctness of the action of shutdown and be beneficial to determine whether a remedial measure is taken. In this case, step S604' may be specifically selected for implementation, so as to determine whether the temperature of the auxiliary temperature sensor unit is lower than the shutdown rough threshold, step S605 is performed if the temperature of the auxiliary temperature sensor unit is not lower than the shutdown rough threshold; if the temperature of the auxiliary temperature sensor unit is lower than the shutdown rough threshold, step S601 is performed after resetting all counters. The set temperature value may be any temperature value from 5° C. to 10° C., such as 5° C.

In step S605, a second counting unit begins counting after being reset, when a count ≥10, the protection mode is entered, and a protection measure is taken against the abnormally working IC, so that the temperature is gradually decreased.

In step S606, after entering the protection mode, it is determined whether the temperature of the main temperature sensor unit is lower than a restoration threshold, when the main temperature sensor unit is ineffective, it is determined whether the temperature of the auxiliary temperature. sensor unit is lower than the restoration threshold, re-determination is performed if the temperature of the auxiliary temperature sensor unit is, not lower than the restoration threshold, and step S607 is performed if the temperature of the auxiliary temperature sensor unit is lower than the restoration threshold.

In step S607, a third counting unit begins counting after being reset, when a count ≥5 and the protection mode is running, a normal mode is restored and network searching and registration are performed.

The alarm threshold is lower than the shutdown threshold, the alarm rough threshold is lower than the shutdown rough threshold, and the restoration threshold is lower than the alarm threshold and the alarm rough threshold.

According to this embodiment of the present invention, the counting unit is disposed, so as to ensure the reliability of the measurement result that is higher than the threshold of the temperature sensor unit, thereby preventing an erroneous report of the thermal protection caused by the fluctuation of the temperature reported by the temperature sensor unit. In this embodiment, two temperature sensor units are used for accurate control of preventing thermal protection caused when the temperature sensor unit is ineffective.

Embodiment 3

Figure 7A:
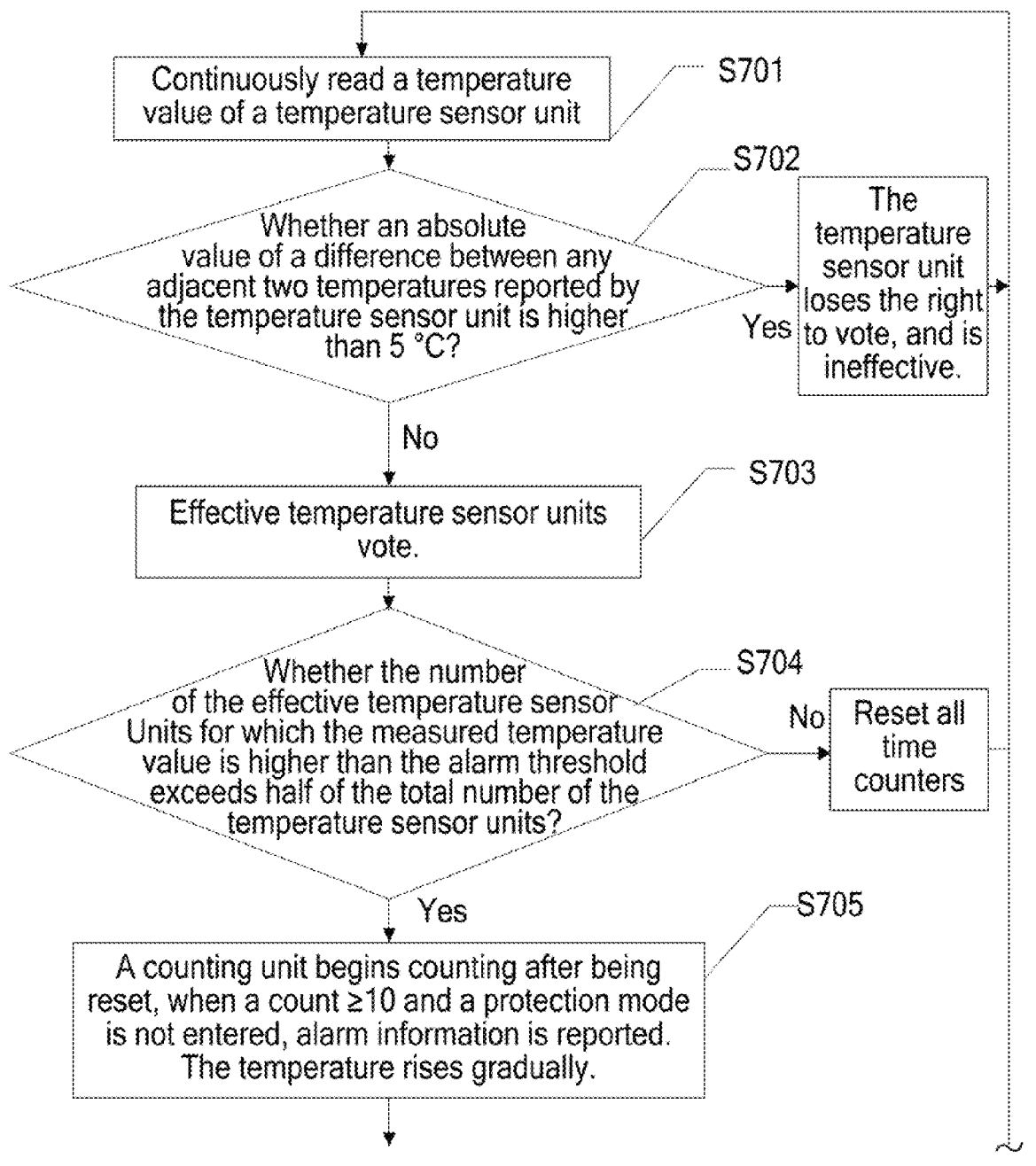
FIGS. 7A and 7B show a flow chart of a third embodiment of a method for preventing an erroneous report of thermal protection according to an embodiment of the present invention.
Figure 7B:
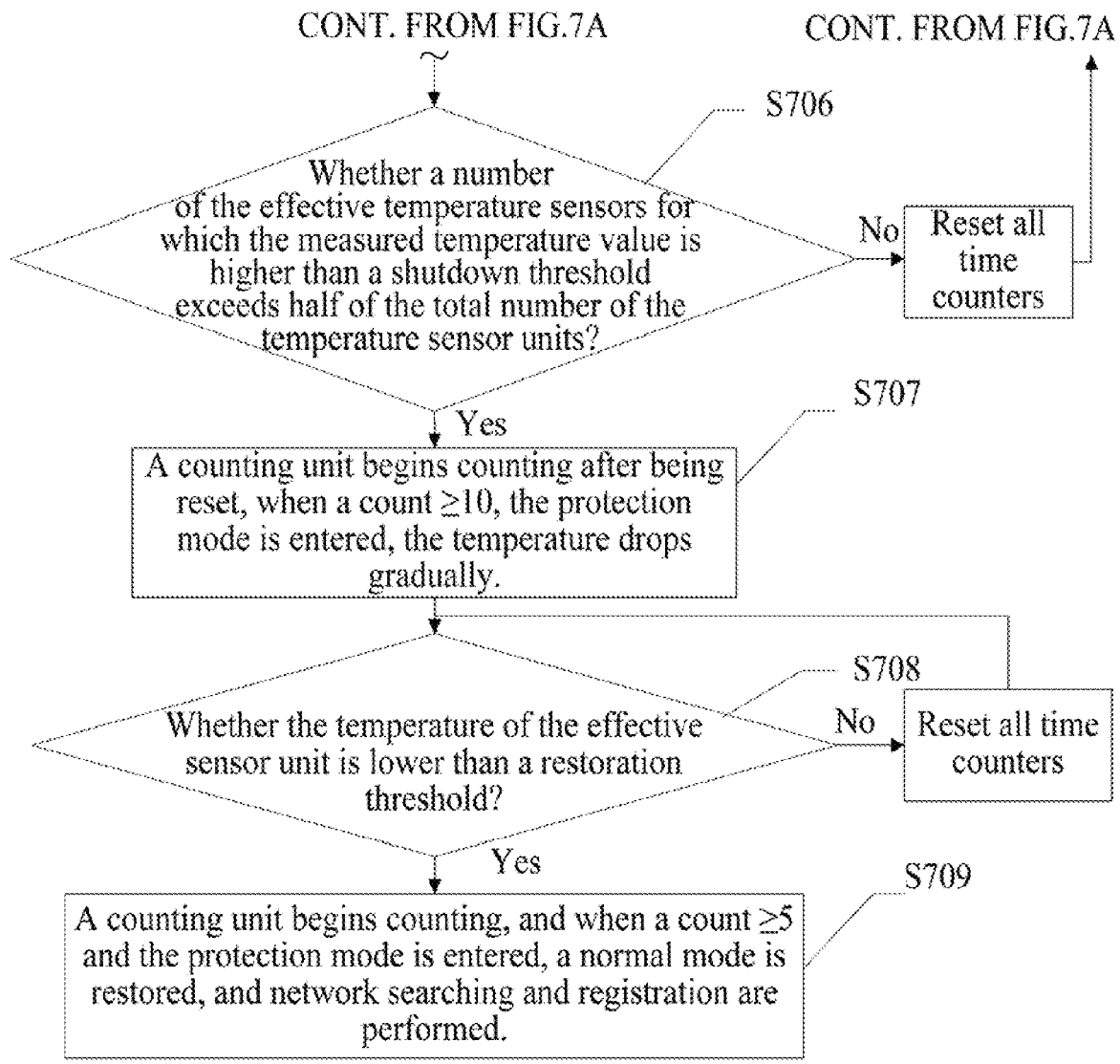

A method for preventing an erroneous report of thermal protection according to another embodiment of the present invention is described hereinafter with reference to FIG. 7. FIG. 7 is a flow chart of a third embodiment of the method for preventing an erroneous report of thermal protection according to an embodiment of the present invention. In this embodiment, a plurality of temperature sensor units is disposed close to a protection point of an IC. The method includes the following steps.

In step S701, a temperature value of each temperature sensor unit is continuously read, so as to obtain the temperature values at the protection point of the IC.

In step S702, it is determined whether an absolute value of a difference between any adjacent two read temperatures reported by any temperature sensor unit is larger than a set temperature value, if a difference between any adjacent two read temperatures reported by any temperature sensor unit is larger than a set temperature value, the temperature sensor unit is ineffective, and loses the right to vote, and in this step, the set temperature value may be any temperature value from 5° C. to 10° C., such as 5° C.

In step S703, effective temperature sensor units vote to determine the number of temperature sensor units for which the measured temperature value is larger than an alarm threshold and a shutdown threshold, thereby the correctness of the protection measure is ensured by providing control of the protection action by the effective temperature sensor units.

In step S704, it is determined whether the number of the effective temperature sensor units for which the measured temperature value is larger than the alarm threshold exceeds half of the total number of the temperature sensor units, so that the correctness of alarming is further determined by using the principle that the minority is subordinate to the majority; all counting units are reset if the number of the effective temperature sensor units for which the measured temperature value is not larger than the alarm threshold exceeds half of the total number of the temperature sensor units, and then step S701 is performed, and step S705 is performed if the number of the effective temperature sensor units for which the measured temperature value is larger than the alarm threshold exceeds half of the total number of the temperature sensor units.

In step S705, a first counting unit begins counting after being reset, when a count ≥10 and a protection mode is not entered, alarm information is reported, so as to warn that the IC is in an abnormal work status, and the temperature rises continuously.

In step S706, it is determined whether the number of the effective temperature sensor unit for which the measured temperature value is larger than a shutdown threshold exceeds half of the total number of the temperature sensor units, so that the correctness of the protection action is further determined by using the principle that the minority is subordinate to the majority; all counting units are reset if the number of the effective temperature sensor unit for which the measured temperature value is larger than a shutdown threshold does not exceed half of the total number of the temperature sensor units, and then step S701 is performed, and step S707 is performed if the number of the effective temperature sensor unit for which the measured temperature value is larger than a shutdown threshold exceeds half of the total number of the temperature sensor units.

In step S707, a second counting unit begins counting after being reset, when a count ≥10, the protection mode is entered, and a protection measure is taken against the abnormally working IC, so that the temperature is gradually decreased.

In step S708, after entering the protection mode, it is determined whether the temperature of the effective temperature sensor units is lower than a restoration threshold, all counting units are reset for re-determination if the temperature of the effective temperature sensor units is not lower than a restoration threshold, and step S709 is performed if the temperature of the effective temperature sensor units is lower than a restoration threshold.

In step 709, a third counting unit begins counting after being reset, when a count ≥5 and the protection mode is running, a normal mode is restored and network searching and registration are performed.

The restoration threshold is lower than the alarm threshold, and the alarm threshold is lower than the shutdown threshold.

According to the embodiment of the present invention, two or more temperature sensor units are disposed, so as to avoid an erroneous report of thermal protection caused by the ineffective temperature sensor unit.

Embodiment 4

Figure 8:
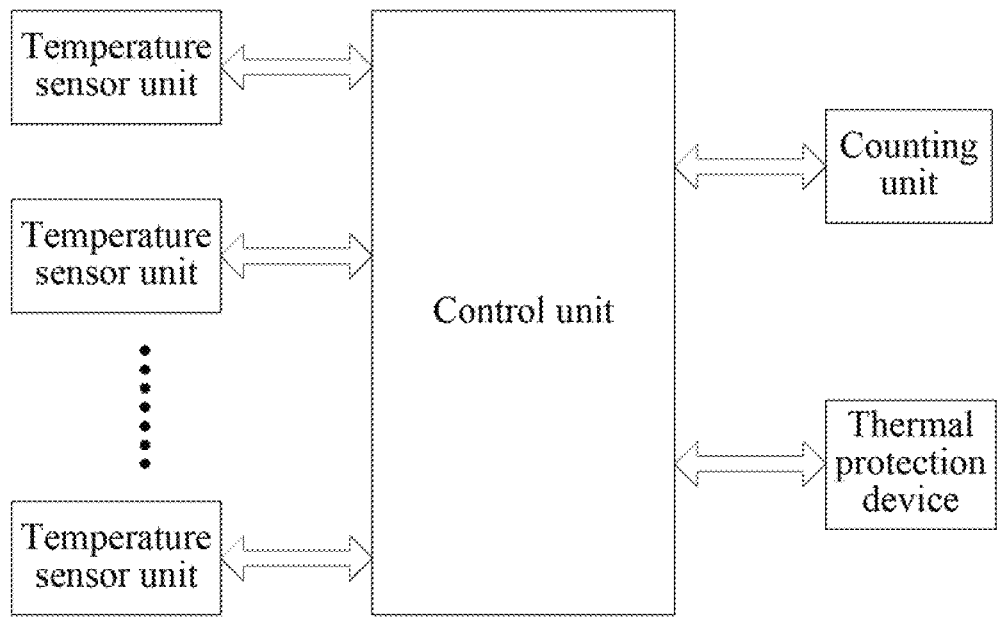
FIG. 8 is a schematic structural view of a first embodiment of a system for preventing an erroneous report of thermal protection according to an embodiment of the present invention.

An embodiment of the thermal protection control system of the present invention is described hereinafter with reference to FIG. 8. FIG. 8 is a schematic structural view of an embodiment of a system for preventing an erroneous report of thermal protection according to an embodiment of the present invention. In this embodiment, the system for preventing an erroneous report of thermal protection of an IC includes a temperature sensor unit, a timing unit, a thermal protection device, and a control device.

The temperature sensor unit is disposed close to a protection point of the IC, and configured to measure a temperature close to the protection point of the IC. The protection point of the IC includes a PA, a PMIC, a UIM card, an SIM card, a USIM card, and a storage card.

The timing unit starts timing, when a comparison result of the control unit is that the measured temperature value reaches or exceeds a temperature threshold corresponding to the thermal protection; stops the timing and is reset if the measured temperature is lower than the temperature threshold in a preset time since then. The timing unit may be a counter, a time interval of each counting is generally 1 s to 10 s, and the preset time is generally 5 counts to 20 counts.

The thermal protection device takes, a protection measure when the time counted by the timing unit exceeds the preset time. The thermal protection device includes an alarm device, a shutdown device, a device for closing a radio frequency module to achieve low power consumption, a device for maintaining standby, or a transmit power regulation device for down regulating a limitation on the highest transmit power and down regulating a transmit power without conforming to a protocol and a base station requirement.

The control unit receives the temperature value of the protection point of the IC measured by the temperature sensor unit, compares the measured temperature value close to the protection point of the IC with the temperature threshold corresponding to the thermal protection, controls the timing unit to start timing when a comparison result is that the temperature value measured by temperature sensor unit reaches or exceeds the thermal protection temperature threshold, and resets the timing unit when the comparison result is that the temperature value measured by the temperature sensor unit is smaller than the thermal protection temperature threshold. If the temperature exceeds the threshold again, re-counting may be begun.

According to the embodiment of the present invention, the counting unit is disposed to ensure the reliability of the measurement result of the temperature sensor unit that is higher than the threshold, so as to prevent an erroneous report of thermal protection caused by fluctuation of a temperature reported by the temperature sensor unit.

Embodiment 5

Figure 9:
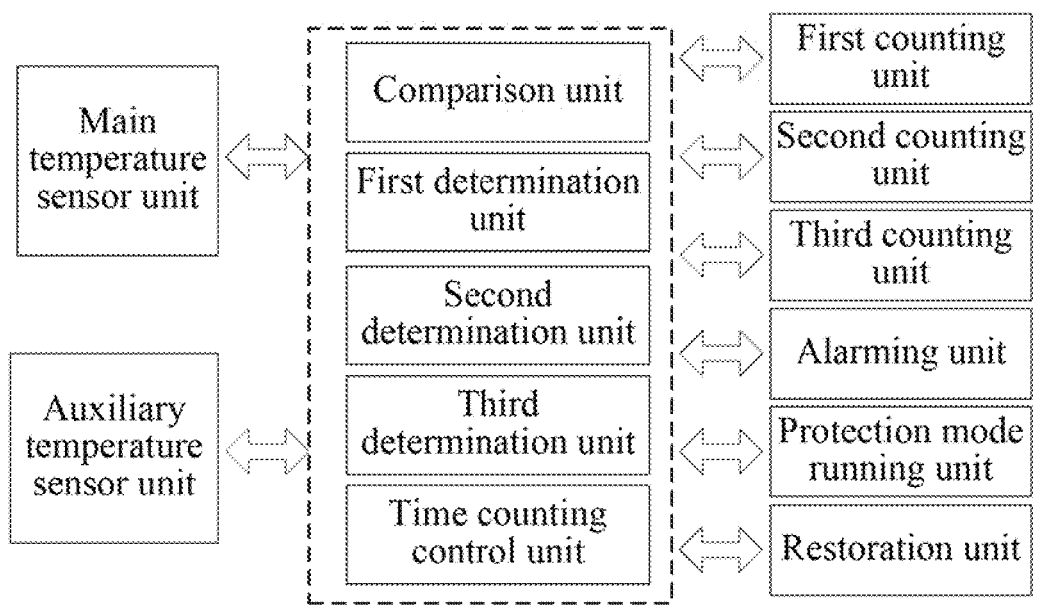
FIG. 9 is a schematic structural view of a second embodiment of a system for preventing an erroneous report of thermal protection according to an embodiment of the present invention.

An embodiment of the thermal protection control system of the present invention is described hereinafter with reference to FIG. 9. FIG. 9 is a schematic structural view of another embodiment of the system for preventing an erroneous report of thermal protection according to an embodiment of the present invention. In this embodiment, the system for preventing the erroneous report of thermal protection of an IC includes a main temperature sensor unit, an auxiliary temperature sensor unit, a first timing unit, a second timing unit, a third timing unit, a comparison unit, a first determination unit, a second determination unit, a third determination unit, a timing control unit, an alarm device, a restoration device, and a protection mode running device.

The main temperature sensor unit has a high read precision, and is configured to read and monitor a temperature of a protected point, and the auxiliary temperature sensor unit has a low precision, but a high reliability, and is generally a temperature sensor unit used for radio frequency temperature compensation. A thermal protection temperature threshold includes an alarm threshold, a shutdown threshold, a restoration threshold, an alarm rough threshold, and a shutdown rough threshold, and the restoration threshold is lower than the alarm threshold.

The comparison unit is configured to compare the temperature value measured by the main temperature sensor unit with the alarm threshold and the protection threshold, and compare the temperature value measured by the auxiliary temperature sensor unit with the protection rough threshold.

The first determination unit is configured to determine whether a first status is reached, whether a second status is reached, and whether the temperature value measured by the main temperature sensor unit reaches or is smaller than the restoration threshold after the protection mode running device starts a protection mode. The first status is a status that a comparison result of the comparison unit in which the temperature measured by the auxiliary temperature sensor unit reaches or exceeds the protection rough threshold, and the temperature measured by the main temperature sensor unit reaches or exceeds the alarm threshold; the second status is a status that the comparison result of the comparison unit in which the temperature measured by the auxiliary temperature sensor unit reaches or exceeds the protection rough threshold, and the temperature measured by the main temperature sensor unit reaches or exceeds the protection threshold.

The second determination unit is configured to determine whether an absolute value of a difference between any adjacent two temperatures measured by the main temperature sensor unit is larger than a set value, and the set value may be any temperature value from 5° C. to 10° C., such as 5° C. When a determination result of the second determination unit is that the absolute value of the difference between the any adjacent two temperatures measured by the main temperature sensor unit is not larger than the set value, the comparison unit compares the temperature value measured by the main temperature sensor unit with the alarm threshold and the protection threshold, and compares the temperature value measured by the auxiliary temperature sensor unit with the protection rough threshold.

The third determination unit is configured to determine whether a third status is reached. The third status is a status that the temperature value measured by the main temperature sensor unit reaches or exceeds the alarm threshold, and the temperature measured by the auxiliary temperature sensor unit does not reach the alarm rough threshold. When a determination result of the third determination unit is that the third status is not reached, the comparison unit compares the temperature value measured by the main temperature sensor unit with the alarm threshold and the protection threshold, and compares the temperature value measured by the auxiliary temperature sensor unit with the protection rough threshold.

The timing control unit is configured to start the first timing unit when a determination result of the first determination unit is that the first status is reached, and reset the first timing unit when the determination result of the first determination unit is that the first status is not reached; start the second timing unit when the determination result of the first determination unit is that the second status is reached, and reset the second timing unit when the determination result of the first determination unit is that the second status is not reached; start the third timing unit when the determination result of the first determination unit is that the temperature measured by the main temperature sensor unit reaches or is lower than the restoration threshold after the protection mode running device starts the protection mode; and reset the third timing unit when the determination result of the first determination unit is that the temperature measured by the main temperature sensor unit is higher than the restoration threshold after the protection mode running device starts the protection mode.

The alarm device is configured to report alarm information when the time counted by the first timing unit reaches a first preset time.

The protection mode running device is configured to start the protection mode when the time counted by the second timing unit reaches a second preset time.

The restoration device is configured to stop the protection mode and enter a normal mode when the time counted by the third timing unit reaches a third preset time.

According to the embodiment of the present invention, the counting unit is disposed to ensure the reliability of the measurement result of the temperature sensor unit that is higher than the threshold, so as to prevent an erroneous report of thermal protection caused by fluctuation of a temperature reported by the temperature sensor unit. In this embodiment, two temperature sensor units are further used for accurate control of preventing thermal protection caused when the temperature sensor unit is ineffective.

Embodiment 6

Figure 10:
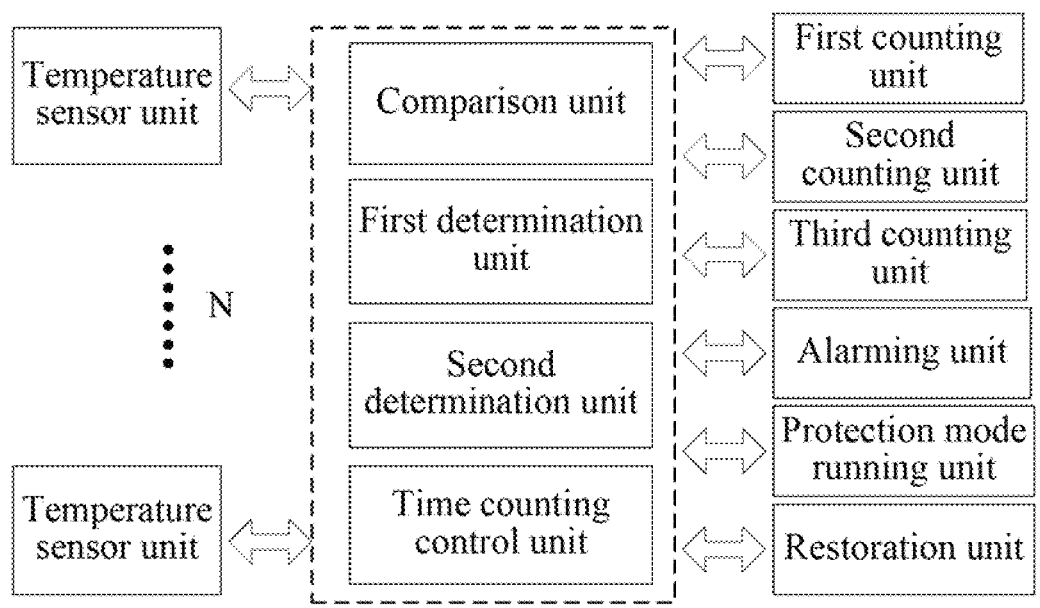
FIG. 10 is a schematic structural view of a third embodiment of a system for preventing an erroneous report of thermal protection according to an embodiment of the present invention.

An embodiment of the thermal protection control system of the present invention is described hereinafter with reference to FIG. 10. FIG. 10 is a schematic structural view of another embodiment of the system for preventing an erroneous report of thermal protection according to an embodiment of the present invention. In this embodiment, the system for preventing the erroneous report of thermal protection H of an IC includes N temperature sensor units (N is greater than or equal to 3), a first timing unit, a second timing unit, a third timing unit, a comparison unit, a first determination unit, a second determination unit, a timing control unit, an alarm device, a restoration device, and a protection mode running device.

A thermal protection temperature threshold includes an alarm threshold, a shutdown threshold, a restoration threshold, an alarm rough threshold, and a shutdown rough threshold, the restoration threshold is lower than the alarm threshold.

The first determination unit is configured to determine whether an absolute value of a difference between any adjacent two temperatures measured by each of the N temperature sensor units is greater than a set temperature, and determine that one temperature sensor unit is not an effective temperature sensor unit if an absolute value of a difference between any adjacent two temperatures measured by said one temperature sensor units is greater than a set temperature, in which a range of the set temperature is from 2° C. to 10° C.; or configured to determine whether each of the N temperature sensor units has an abnormal value, and determine that one temperature sensor unit is not the effective temperature sensor unit if said one temperature sensor units has an abnormal value, in which the abnormal value is below −30° C. or above 200° C.

The second determination unit is configured to determine whether an effective status is reached, whether a first status is reached, whether a second status is reached, and whether a third status is reached after the protection mode running device starts a protection mode. The first status is a status that a temperature measured by effective temperature sensor units reaches or exceeds the alarm threshold, and the number of the effective temperature sensor units for which the measured temperature reaches or exceeds the alarm threshold is greater than or equal to N/2; the second status is a status that a temperature measured by effective temperature sensor units reaches or exceeds the protection threshold, and the number of the effective temperature sensor units for which the measured temperature reaches or exceeds the protection threshold is greater than or equal to N/2; the third status is a status that a temperature measured by effective temperature sensor units reaches or is lower than the restoration threshold and the number of the effective temperature sensor units for which the measured temperature reaches or is lower than the restoration threshold is greater than or equal to N/2.

The timing control unit is configured to start the first timing unit to count time when a determination result of the second determination unit is that the first status is reached, and reset the first timing unit when the determination result of the second determination unit is that the first status is not reached; start the second timing unit to count time when the determination result of the second determination unit is that the second status is reached, and reset the second timing unit when the determination result of the second determination unit is that the second status is not reached; and start the third timing unit to count time when the determination result of the second determination unit is that the third status is reached, and reset the third timing unit when the determination result of the second determination unit is that the third status is not reached.

The alarm device is configured to report alarm information when the first timing unit reaches a first preset time.

The protection mode running device is configured to start the protection mode when the time counted by the second timing unit reaches a second preset time.

The restoration device is configured to stop the protection mode and enter the normal mode when the time counted by the third timing unit reaches a third preset time.

Though, in all the embodiments of the present invention, thermal protection control is employed in a case that a temperature is higher than a certain temperature threshold, it should be understood by persons of skill in the art that the present invention is also applicable to protection control employed when the temperature is lower than the certain temperature threshold.

The steps of the method or algorithms described with reference to the embodiments disclosed herein may be directly implemented with hardware, a software module executed by a processor, or a combination thereof. The software module may reside in a Random Access Memory (RAM), a flash memory, a Read Only Memory (ROM), an electrically programmable ROM, an electrically erasable programmable ROM, a register, a hard disk, a movable disk, a Compact Disk Read-Only Memory (CD-ROM), or any other forms of storage media known in the art.

The objectives, technical solutions, and beneficial effects of the present invention are further described in detail through the above specific embodiments. It should be understood that the above descriptions are merely specific embodiments of the present invention, but not intended to limit the present invention. Any modification, equivalent replacement, or improvement made without departing from the spirit and principle of the present invention should fall within the protection scope of the present invention.

What is claimed is:
1. A method for controlling thermal protection, comprising:
measuring a temperature value of a protection point of an Integrated Circuit (IC) by disposing temperature sensor units close to the protection point of the IC;
comparing the measured temperature value with a thermal protection temperature threshold;

starting timing when the measured temperature value reaches or exceeds the thermal protection temperature threshold; and starting a protection when a duration of the timing reaches or exceeds the preset time, wherein the temperature sensor units comprise a main temperature sensor unit and an auxiliary temperature sensor unit, wherein the thermal protection temperature threshold comprises an alarm threshold, a protection threshold, an alarm rough threshold, and a protection rough threshold, wherein the alarm threshold is lower than the protection threshold, wherein the alarm rough threshold is lower than the protection rough threshold, wherein comparing the measured temperature value with the thermal protection temperature threshold comprises comparing a temperature value measured by the main temperature sensor unit with the alarm threshold and the protection threshold, and comparing a temperature value measured by the auxiliary temperature sensor unit with the alarm rough threshold, wherein starting the protection when the measured temperature value reaches or exceeds the thermal protection temperature threshold and the duration of reaching or exceeding the thermal protection temperature threshold exceeds the preset time comprises reporting alarm information when a first status is reached and a duration of the first status exceeds a first preset time, wherein the first status is a status that the temperature value measured by the auxiliary temperature sensor unit reaches or exceeds the alarm rough threshold and the temperature value measured by the main temperature sensor unit reaches or exceeds the alarm threshold, and starting a protection mode when a second status is reached and a duration of the second status exceeds a second preset time, and wherein the second status is a status that the temperature value measured by the auxiliary temperature sensor unit reaches or exceeds the protection rough threshold, and the temperature value measured by the main temperature sensor unit reaches or exceeds the protection threshold.

2. The method according to claim 1, wherein if the temperature value measured by the main temperature sensor unit reaches or exceeds the alarm threshold, and the temperature value measured by the auxiliary temperature sensor unit does not reach the alarm rough threshold, then the main temperature sensor unit becomes ineffective and does not provide thermal protection control, and the thermal protection control is provided by the auxiliary temperature sensor unit.

3. The method according to claim 1, further comprising stopping the protection to restore to a normal mode after starting the protection when the temperature measured by the temperature sensor unit reaches or is lower than a restoration threshold, and a duration of reaching or being lower than the restoration threshold exceeds a preset time, wherein the restoration threshold is lower than the temperature threshold.

4. The method according to claim 1, wherein the protection mode comprises shutdown, a low power consumption mode of closing a radio frequency module, a standby mode of only maintaining registration, down regulating a limitation on the highest transmit power, and down regulating a transmit power without conforming to a protocol and a base station requirement.

5. A method for controlling thermal protection, comprising:

measuring a temperature value of a protection point of an Integrated Circuit (IC) by disposing temperature sensor units close to the protection point of the IC;

comparing the measured temperature value with a thermal protection temperature threshold;

starting timing when the measured temperature value reaches or exceeds the thermal protection temperature threshold; and starting a protection when a duration of the timing reaches or exceeds the preset time, wherein the temperature sensor units comprise N temperature sensor units, wherein N is a natural number greater than or equal to 3, wherein before comparing the measured temperature value with the thermal protection temperature threshold, the method further comprises determining whether the N temperature sensor units are effective temperature sensor units, wherein starting the protection when the measured temperature value reaches or exceeds the thermal protection temperature threshold and the duration of reaching or exceeding the thermal protection temperature threshold exceeds the preset time comprises starting the protection when the effective temperature sensor units reach an effective status, and a duration of the effective status exceeds a preset time, and wherein the effective status is a status that the temperature measured by the effective temperature sensor units reaches or exceeds the thermal protection temperature threshold, and the number of the effective temperature sensor units by which the measured temperature reaches or exceeds the thermal protection temperature threshold is greater than or equal to N/2.

6. The method according to claim 5, wherein when the thermal protection temperature threshold comprises the alarm threshold and the protection threshold, comparing the measured temperature value with the thermal protection temperature threshold comprises comparing a temperature measured by each effective temperature sensor unit with the alarm threshold, and comparing the temperature measured by each effective temperature sensor unit with the protection threshold, and wherein starting the protection when the effective temperature sensor units reach the effective status, and the duration of the effective status exceeds the preset time comprises reporting alarm information when the effective temperature sensor units reach a first status, and a duration of the first status exceeds a first preset time, wherein the first status is a status that the temperature measured by the effective temperature sensor units reaches or exceeds the alarm threshold, and the number of the effective temperature sensor units by which the measured temperature reaches or exceeds the alarm threshold is greater than or equal to N/2, and starting a protection mode when the effective temperature sensor units reach a second status, and a duration of the second status exceeds a second preset time, wherein the second status is a status that the temperature measured by the effective temperature sensor units reaches or exceeds the protection threshold, and the number of the effective temperature sensor units by which the measured temperature reaches or exceeds the protection threshold is greater than or equal to N/2.

7. The method according to claim 6, wherein the protection mode comprises shutdown, a low power consumption mode of closing a radio frequency module, a standby mode of only maintaining registration, down regulating a limitation on the highest transmit power, and down regulating a transmit power without conforming to a protocol and a base station requirement.

8. The method according to claim 5, further comprising stopping the protection to restore to a normal mode after starting the protection when the temperature measured by the temperature sensor unit reaches or is lower than a restoration threshold and a duration of reaching or being lower than the restoration threshold exceeds a preset time, and wherein the restoration threshold is lower than the temperature threshold.

9. A thermal protection control system, comprising:
a temperature sensor unit disposed close protection point and configured to measure a temperature value of the protection point;
a timing unit configured to count time;
a control unit configured to compare the temperature value measured by the temperature sensor unit with a thermal protection temperature threshold, control the timing unit to start timing when a comparison result of the control unit is that the temperature value measured by temperature sensor unit reaches or exceeds the thermal protection temperature threshold, and reset the timing unit when the comparison result of the control unit is that the temperature value measured by the temperature sensor unit is lower than the thermal protection temperature threshold; and
a thermal protection device configured to take a protection on the protection point when the time counted by the timing unit exceeds a preset time,
wherein the temperature sensor unit comprises a main temperature sensor unit and an auxiliary temperature sensor unit,
wherein the thermal protection temperature threshold comprises an alarm threshold, a protection threshold, an alarm rough threshold, and a protection rough threshold,
wherein the timing unit comprises a first timing unit and a second timing unit,
wherein the control unit comprises a comparison unit, a determination unit, and a timing unit,
wherein the comparison unit is configured to compare the temperature value measured by the main temperature sensor unit with the alarm threshold and the protection threshold, and compare the temperature value measured by the auxiliary temperature sensor unit with the protection rough threshold,
wherein the determination unit is configured to determine whether a first status is reached, and whether a second status is reached,
wherein the first status is a status that a comparison result of the comparison unit in which the temperature measured by the auxiliary temperature sensor unit reaches or exceeds the alarm rough threshold and the temperature measured by the main temperature sensor unit reaches or exceeds the alarm threshold,
wherein the second status is a status that the comparison result of the comparison unit in which the temperature measured by the auxiliary temperature sensor unit reaches or exceeds the protection rough threshold, and the temperature measured by the main temperature sensor unit reaches or exceeds the protection threshold,
wherein the timing control unit is configured to start the first timing unit when a determination result of the determination unit is that the first status is reached, reset the first timing unit when the determination result of the determination unit is that the first status is not reached, start the second timing unit when the determination result of the determination unit is that the second status is reached, and reset the second timing unit when the determination result of the determination unit is that the second status is not reached, and wherein the protection device comprises an alarm device configured to report alarm information when the time counted by the first timing unit reaches a first preset time, and a protection mode running device configured to start a protection mode when the time counted by the second timing unit reaches a second preset time.

10. The system according to claim 9, wherein the thermal protection temperature threshold comprises a restoration threshold, wherein the restoration threshold is lower than the alarm threshold, wherein the timing unit further comprises a third timing unit, wherein the determination unit is further configured to determine whether the temperature measured by the main temperature sensor unit reaches or is lower than the restoration threshold after the protection mode running device starts the protection mode, wherein the timing control unit is further configured to start the third timing unit when the determination result of the determination unit is that the temperature measured by the main temperature sensor unit reaches or is lower than the restoration threshold after the protection mode running device starts the protection mode, and reset the third timing unit when the determination result of the determination unit is that the temperature measured by the main temperature sensor unit is larger than the restoration threshold after the protection mode running device starts the protection mode, and wherein the system further comprises a restoration device configured to stop the protection mode and enter a normal mode when the time counted by the third timing unit reaches a third preset time.

11. A thermal protection control system, comprising:
a temperature sensor unit disposed close to a protection point and configured to measure a temperature value of the protection point;
a timing unit configured to count time;
a control unit configured to compare the temperature value measured by the temperature sensor unit with a thermal protection temperature threshold, control the timing unit to start timing when a comparison result of the control unit is that the temperature value measured by temperature sensor unit reaches or exceeds the thermal protection temperature threshold, and reset the timing unit when the comparison result of the control unit is that the temperature value measured by the temperature sensor unit is lower than the thermal protection temperature threshold; and
a thermal protection device configured to take a protection on the protection point when the time counted by the timing unit exceeds a preset time,
wherein the temperature sensor unit comprises N temperature sensor units,
wherein N is a natural number greater than or equal to 3, and
wherein the control unit comprises:
a first determination unit configured to determine whether the N temperature sensor units are effective temperature sensor units;
a second determination unit configured to determine whether an effective status is reached, wherein the effective status is a status that the temperature measured by the effective temperature sensor units determined by the first determination unit reaches or exceeds the thermal protection temperature threshold, and the number of the effective temperature sensor units by which the measured temperature reaches or exceeds the thermal protection temperature threshold is greater than or equal to N/2; and
a timing control unit configured to start the timing unit to count time when a determination result of the second determination unit is that the effective status is reached, and reset the timing unit when the determination result of the second determination unit is that the effective status is not reached.

12. The system according to claim 11, wherein the thermal protection temperature threshold comprises an alarm threshold and a protection threshold, wherein the timing unit comprises a first timing unit and a second timing unit, wherein the second determination unit is specifically configured to determine whether a first status is reached, and whether a second status is reached, wherein the first status is a status that the temperature measured by the effective temperature sensor units reaches or exceeds the alarm threshold, and the number of the effective temperature sensor units by which the measured temperature reaches or exceeds the alarm threshold is greater than or equal to N/2, wherein the second status is a status that the temperature measured by the effective temperature sensor units reaches or exceeds the protection threshold, and the number of the effective temperature sensor units by which the measured temperature reaches or exceeds the protection threshold is greater than or equal to N/2, wherein the timing control unit is specifically configured to start the first timing unit to count time when a determination result of the second determination unit is that the first status is reached, reset the first timing unit when the determination result of the second determination unit is that the first status is not reached, start the second timing unit to count time when the determination result of the second determination unit is that the second status is reached, and reset the second timing unit when the determination result of the second determination unit is that the second status is not reached, and wherein the thermal protection device comprises an alarm device configured to report alarm information when the first timing unit reaches a first preset time, and a protection mode running device configured to start a protection mode when the time counted by the second timing unit reaches a second preset time.

13. The system according to claim 12, wherein the thermal protection temperature threshold comprises a restoration threshold, wherein the restoration threshold is lower than the alarm threshold, wherein the timing unit further comprises a third timing unit, wherein the second determination unit is further configured to determine whether a third status is reached, wherein the third status is a status that the temperature measured by the effective temperature sensor units reaches or is lower than the restoration threshold and the number of the effective temperature sensor units by which the measured temperature reaches or exceeds the restoration threshold is greater than or equal to N/2 after the protection mode running device starts the protection mode, wherein the timing control unit is further configured to start the third timing unit when the determination result of the second determination unit is that the third status is reached, and reset the third timing unit when the determination result of the second determination unit is that the third status is not reached, and wherein the system further comprises a restoration device configured to stop the protection mode and enter a normal mode when the time counted by the third timing unit reaches a third preset time.

14. The system according to claim 11, wherein the thermal protection temperature threshold comprises a restoration threshold, wherein the restoration threshold is lower than the alarm threshold, wherein the timing unit further comprises a third timing unit, wherein the second determination unit is further configured to determine whether a third status is reached, wherein the third status is a status that the temperature measured by the effective temperature sensor units reaches or is lower than the restoration threshold and the number of the effective temperature sensor units by which the measured temperature reaches or exceeds the restoration threshold is greater than or equal to N/2 after the protection mode running device starts the protection mode, wherein the timing control unit is further configured to start the third timing unit when the determination result of the second determination unit is that the third status is reached, and reset the third timing unit when the determination result of the second determination unit is that the third status is not reached, and wherein the system further comprises a restoration device configured to stop the protection mode and enter a normal mode when the time counted by the third timing unit reaches a third preset time.

* * * * *

UNITED STATES PATENT AND TRADEMARK OFFICE
CERTIFICATE OF CORRECTION

PATENT NO. : 8,699,196 B2
APPLICATION NO. : 13/163023
DATED : April 15, 2014
INVENTOR(S) : Lingfang Jin et al.

It is certified that error appears in the above-identified patent and that said Letters Patent is hereby corrected as shown below:

In the Claims

Column 16, Lines 1-39, Claim 22 should read:

A thermal protection control system, comprising:
a temperature sensor unit disposed close to a protection point and configured to measure a temperature value of the protection point;
a timing unit configured to count time;
a control unit configured to compare the temperature value measured by the temperature sensor unit with a thermal protection temperature threshold, control the timing unit to start timing when a comparison result of the control unit is that the temperature value measured by temperature sensor unit reaches or exceeds the thermal protection temperature threshold, and reset the timing unit when the comparison result of the control unit is that the temperature value measured by the temperature sensor unit is lower than the thermal protection temperature threshold; and
a thermal protection device configured to take a protection on the protection point when the time counted by the timing unit exceeds a preset time,
wherein the temperature sensor unit comprises a main temperature sensor unit and an auxiliary temperature sensor unit,
wherein the thermal protection temperature threshold comprises an alarm threshold, a protection threshold, an alarm rough threshold, and a protection rough threshold,
wherein the timing unit comprises a first timing unit and a second timing unit,
wherein the control unit comprises a comparison unit, a determination unit, and a timing unit,
wherein the comparison unit is configured to compare the temperature value measured by the main temperature sensor unit with the alarm threshold and the protection threshold, and compare the temperature value measured by the auxiliary temperature sensor unit with the protection rough threshold,
wherein the determination unit is configured to determine whether a first status is reached, and whether a second status is reached, Signed and Sealed this
Twentieth Day of January, 2015

Michelle K. Lee
*Deputy Director of the United States Patent and Trademark Office* wherein the first status is a status that a comparison result of the comparison unit in which the temperature measured by the auxiliary temperature sensor unit reaches or exceeds the alarm rough threshold and the temperature measured by the main temperature sensor unit reaches or exceeds the alarm threshold, wherein the second status is a status that the comparison result of the comparison unit in which the temperature measured by the auxiliary temperature sensor unit reaches or exceeds the protection rough threshold, and the temperature measured by the main temperature sensor unit reaches or exceeds the protection threshold, wherein the timing control unit is configured to start the first timing unit when a determination result of the determination unit is that the first status is reached, reset the first timing unit when the determination result of the determination unit is that the first status is not reached, start the second timing unit when the determination result of the determination unit is that the second status is reached, and reset the second timing unit when the determination result of the determination unit is that the second status is not reached, and wherein the protection device comprises an alarm device configured to report alarm information when the time counted by the first timing unit reaches a first preset time, and a protection mode running device configured to start a protection mode when the time counted by the second timing unit reaches a second preset time.